Sept. 25, 1962 E. S. PETERSON 3,055,985

RESIDENTIAL OR FARM INTERCOM TELEPHONE SYSTEM

Filed Dec. 29, 1958

INVENTOR.
Edward S. Peterson
BY C. R. Sipe
Atty.

United States Patent Office 3,055,985
Patented Sept. 25, 1962

3,055,985

RESIDENTIAL OR FARM INTERCOM TELEPHONE SYSTEM

Edward S. Peterson, Bensenville, Ill., assignor to Automatic Electric Laboratories, Inc., a corporation of Delaware Filed Dec. 29, 1958, Ser. No. 783,549
4 Claims. (Cl. 179—40)

The present invention relates in general to telephone systems and more particularly to small business establishments, residential, or farm intercommunication telephone and signalling systems of the type wherein a plurality of telephone stations on a single subscriber line are utilized for intercom as well as outside calls.

On farms as well as certain business establishments, where a plurality of telephone stations are necessary, it is advantageous to have intercom systems as well as regular main exchange telephone service. On farms where more than one structure, such as barns, tool sheds etc., surround the farmer's residence, wherein the farmer is likely to be at any one of these structures during the day, it is advantageous for him to have an intercom interconnecting all of these buildings in order to locate him, or for him to locate someone else, such as the farm hands. It would also be to the farmer's benefit, since he is seldom at his residence during the day, to have a regular exchange telephone at the residence with extensions to the different structures dispersed over the farmland so that he can answer or make regular exchange calls. To have both of these separate systems, would undoubtedly be a financial burden to most farmers. Likewise, in certain business establishments, such as warehouses, where only a handful of men would handle a few floors in a single building, there would be a similar need, and the same benefits would result from an intercom with connections to an outside line. Furthermore, on farms as well as the mentioned warehouse, the arrival of business guests at the front door, more than likely would not find the occupants in any one location. Therefore, these occupants from any location may further have need for a two-way transmission system to the front entrance to converse with their guests.

It is therefore an object of this invention to provide a plurality of telephone stations connectable to a single subscriber line and dispersed within an establishment, with each station being utilized for intercom, main exchange and front door calls.

It is another object of this invention to provide an improved, simple, and economical system of the character described in which, a plurality of telephone stations are each provided with push-turn keys for commonly answering incoming or making outgoing calls by leaving the key in an unturned or normal position; making or accepting intercom calls by manually turning the key; and answering a caller over a loudspeaker-microphone arrangement at the residence front door by manually depressing the key.

It is another object of this invention to provide one common A.C. ringer to respond to a ringing frequency on incoming calls from a main exchange, as well as an A.C. ringing relay in series therewith to intermittently operate responsive to the ringing frequency to initiate D.C. relay means to simultaneously ring D.C. ringers individual to each telephone station.

It is another object of this invention in combination with the above-described object, to further initiate only said D.C. ringers on intercom calls by making them responsive to dialling wherein they will act as code ringers by ringing only the number of times corresponding to the digit dialled.

It is another object of this invention to provide a single ring at all of said stations upon the initiation and termination of an intercom call, to indicate said initiation to other stations to await a code ring to follow, and indicate said termination and notify all parties at said stations that the intercom line is free for usage.

It is still a further object of this invention to permit intercom calls by two or more stations at a time when a main exchange call is in progress to another station, by the manual manipulations of said push-turn keys to certain predetermined positions.

It is still a further object to provide a D.C. power supply derived from rectified commercial alternating current at the residence to provide the necessary transmission battery for intercom service, independent of the main exchange transmission battery on outside main exchange calls.

Other objects and advantages of this invention will become apparent from a perusal of the following specification taken in combination with the accompanying drawing, of which;

Figures 1, 2:
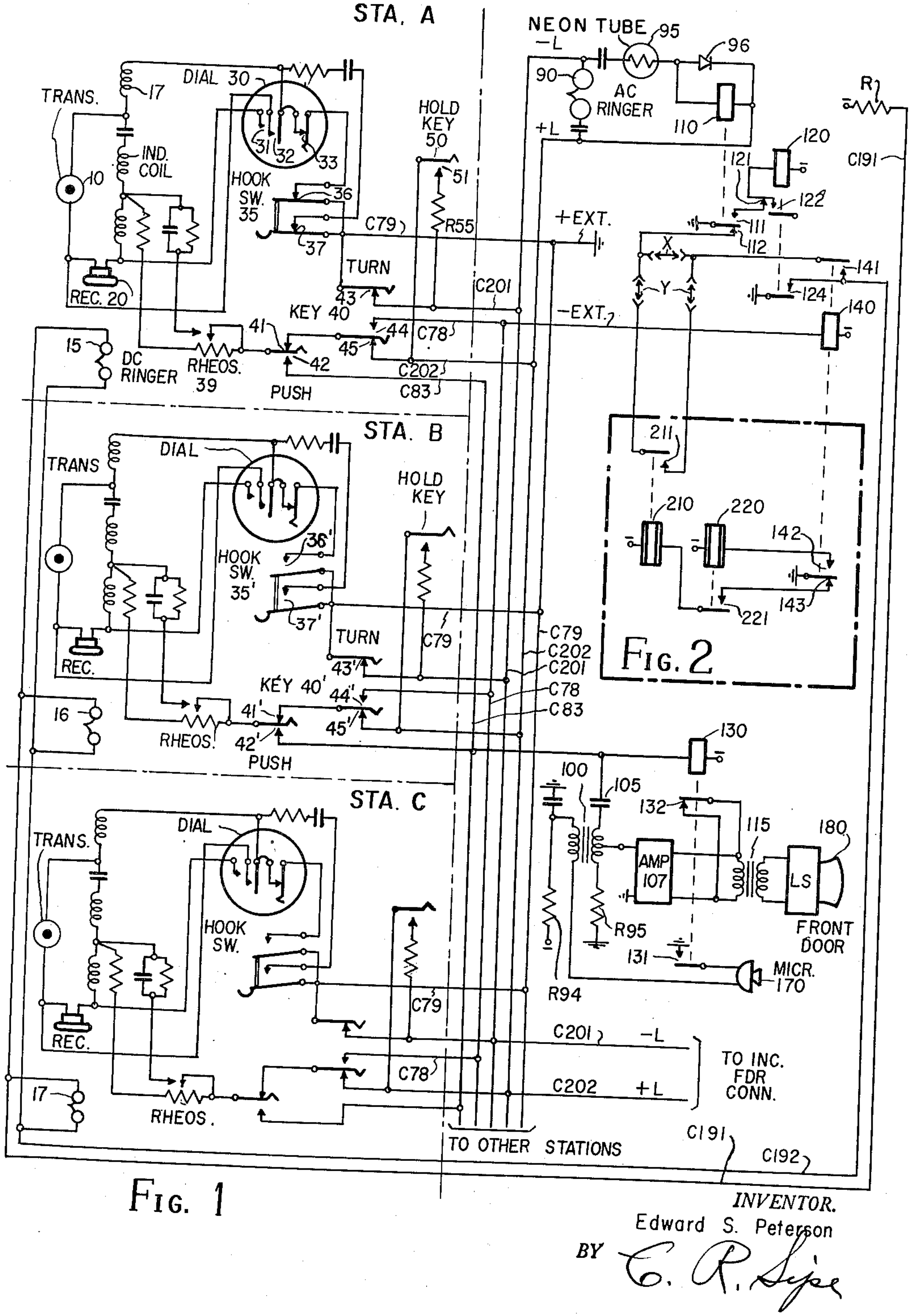
FIG. 1 shows the general layout of the intercomunication telephone system and connection to subscriber line extending to the main telephone exchange.
FIG. 2 shows an addition or modification of the system.

Referring to FIG. 1, there is shown a plurality of telephone stations belonging to a single subscriber, but having different locations within a given area. It is to be understood that only three stations have been shown for exemplary purposes, but that the number of stations would depend upon the need. For instance, in regards to a large farm, station A may be located in the house of residence, station B may be located in the barn, and station C may be in the farmer's tool shed.

Each telephone station comprises the usual telephone instruments, such as transmitter 10, receiver 20, the dial 30 and hookswitch 35, as shown at station A. Each station also has a push-turn key, such as 40, of the type disclosed in an application of Robert E. Spitler, Serial No. 655,382, filed April 26, 1957 now U.S. Patent No. 2,894,079 granted July 7, 1959. In this Spitler application, the depression of the key actuates a first set of springs, and the turning of the key actuates a second set of springs. Each station also has a hold or exclusion key, such as 50, for holding the main exchange line while the party may tend to something else, such as signal another station to notify the party at that particular station that a main exchange call is awaiting his attention. Also, each sation has a D.C. ringer, such as 15, 16, and 17, for signalling each station simultaneously, as will be more fully explained in the ensuing description.

A well-known power pack (not shown) for rectifying commercial A.C. current to provide 48 volt D.C. current is provided at the residence to provide talking battery for intercom connections, to provide current to control the loudspeaker intercom system, to operate the individual station ringers, such as 15, 16 and 17, and to operate a few relays, namely relays 120, 130, 140 and in the modification of FIG. 2, relays 210 and 220. In the drawing the D.C. positive pole of the rectified current is designated by the usual ground symbol and the D.C. negative pole of the rectified current is designated by the usual negative (—) symbol. However, it should be understood that the D.C. positive pole of this rectified current is not earthed and is therefore isolated from the battery potentials at the main telephone exchange wherein the main exchange battery has its positive pole earthed, or grounded, in the usual manner. An A.C. ringer 90 is bridged across the line conductors of the subscriber line in multiple with relay 110. A neon tube 95 is connected in series with relay 110 and a rectifier 96 is connected in shunt of relay 110 to insure the operation of relay 110 when main exchange ringing current is connected to the subscriber line conductors. Relay 110, in turn controls the operation of relay 120, which in turn controls the connection of a source of D.C. ringing current to the ringers 15, 16 and 17. Relay 140 also controls the connection of a source of D.C. ringing current to the ringers, but is controlled by the push-turn keys and can be pulsed by the dials at the stations. Relay 140 furnishes transmission current for intercom calls. Relay 130 is also under the control of the push-turn keys at the stations, to in turn control the loudspeaker 180 and microphone 170 at the front door. Relays 210 and 220 as mentioned, are used as modifications of the present invention to prevent a termination ring at the termination of an intercom call which will be made fully explained in the ensuing description to follow.

*Outside Calls (Main Exchange)*

In order for any of the telephone stations, such as A, to make an outgoing call through the main exchange, the removal of the telephone handset from the hookswitch 35 (shown in operated position) will close a loop circuit to the line circuit (not shown) at the main exchange, via conductors C201 and C202; the loop circuit extending via + conductor C202, key contacts 45, 41, through a rheostat 39, receiver 20, transmitter 10, induction coil winding 17, pulsing contacts 33, hookswitch contacts 36, key contacts 43, and back over − conductor C201. In a well-known manner the main exchange subscriber line circuit causes a finder-selector link to be associated with the subscriber line and by means of the dial 30, the calling party will proceed to dial the desired directory number of another subscriber line in a well-known manner.

*Incoming MAX Calls*

On an incoming call via the main exchange, a connector thereat will transmit a series of interrupted ringing signals over conductors C201 and C202, after seizure of this line in a well-known manner. The ringer 90 will thus respond to the ringing signals over conductors C201 and C202, as well as break down the neon tube 95 to operate the relay 110. Relay 110 in operating closes rectified positive current designated ground at contacts 111 to relay 120. Relay 120 operates, and by means of its contacts 121 and 122 will intermittently open and close its operating circuit. Therefore, contacts 124 will also intermittently close and open, to intermittently close a circuit to ring the ringers 15, 16, and 17; over a circuit including rectified negative current designated by the usual (−) negative battery symbol resistance R, conductor C191, through ringers 15, 16 and 17, conductor C192, to intermittent rectified positive current designated ground at contacts 124. It is to be understood that the A.C. ringer 90 is necessary because in case of a local commercial power failure, the rectified direct current would not be available to all ringers. Also, the ringer 90 in regards to the farm, may be mounted on a pole in the farmer's yard, so that the farmer who may not be in the immediate vicinity of any of the telephone stations, may be able to hear the ringing. Or, the A.C. ringer 90 could be located at one of the stations, wherein this station may have a party who would answer all incoming calls.

Assuming that the call is answered at station A, the removal of the handset from the hookswitch 35 will place the called party's telephone loop across the subscriber line to cut off the ringing. Transmission battery will be provided from the main exchange, and the two parties may thus converse.

*Transferring an Outside Call*

Assuming that when the party at station A answered the above-described outside call, it is learned that he is not the party wanted. Instead, assuming that the party wanted is known to be at station B, the party at station A would operate his hold key 50 to place a resistance R55 across the outside line to hold this line. The party at station A would then proceed to manually turn the combination push-turn key 40, whereby key contacts 43 and 45 opens the subscriber line loops, the line being held as mentioned by the hold key 50. The key contacts 44 close a circuit to relay 140; the circuit extending from rectified negative direct current, winding of relay 140, conductor C78, key contacts 44, 41, rheostat 39, receiver 20, transmitter 10 of station A, coil 17, pulsing contacts 33, hookswitch contacts 36, extension lead C79 to the rectified positive direct current designated ground. Relay 140 operates, and assuming the use only of the "X" wiring, at contacts 141 a D.C. positive current is closed to ringers 15, 16, and 17; the circuit extending from the rectified negative current designated by the usual (−) battery symbol resistance R, conductor C191, through the ringers, conductor C192, contacts 141, "X" wiring, contacts 112 to ground designating rectified positive direct current. The striker rods of the fingers 15, 16 and 17 will thus each strike only one of the bells of the ringers in the direction of the current flow affecting the ringer armature. This single ring, or clang, will thus notify all of the stations that a code ring is to follow, and the parties involved should wait and listen to determine if the code ring is their particular ringing code. Assuming that the party wanted has a ringing code of five rings, the party at station A will dial the digit "5," whereby the dialling thereof will open the dial spring contacts 33 to open and close the circuit to relay 140 five times. Relay 140 will follow the dial pulses to open and close contacts 141 five times to cause the ringers 15, 16 and 17 to ring five times. Since it was assumed that the party wanted was at station B, upon the party at station B hearing his ringing code, he will turn his push-turn key 40' and remove his handset from hookswitch 35'. This last operation would close the intercom or extension loop conductors C78 and C79 between stations A and B. Transmission potential would be provided through the winding of relay 140. Over this loop circuit the party at station B will be notified by the party at station A that a call is awaiting his attention from the main exchange. The party at station B will then proceed to return his push-turn key 40' to its normal position (as shown) to connect with the outside line conductors C201 and C202. The party at station A may then proceed to return keys 40 and 50 to normal and disconnect his telephone from the outside line by hanging up his handset.

It becomes obvious that the above-described transfer could be accomplished by any of the stations. The dialling of a predetermined dialled code digit need not necessarily designate a station, but more than likely would designate a certain person who would only answer from any station when he heard his code rung.

*Utilizing A Loudspeaker to Answer the Front Door*

Assuming that a salesman or other guest, comes to the front door of the residence, and presses the door bell ringing button to operate the door bell, or buzzer (not shown) and the resident would answer by depressing his combination push-turn key, and remove his receiver from the hookswitch. Assuming this party to be at station A, a circuit would be closed to relay 130; the circuit extending from the designated battery symbol, winding of relay 130, conductor C83, key contacts 42 (in depressed position), rheostat 39, transmitter T, coil 17, pulsing springs 33, hookswitch contacts 36, + extension lead C79 to the designated ground potential. In case station A was talking over the outside line at the time the door bell was operated, then station A would operate the hold key 50 prior to the operation of the push key. The operation of hold key 50 would place resistance R55 across the outside line to hold this connection while answering the front door over the loudspeaker system. Relay 130 operates, closing positive current designated by the ground symbol at contacts 131 to carbon microphone 170 via the primary winding of hybrid coil 100 to resistance R94 and the negative current designated by the (−) battery symbol. At contacts 132, a shunt is opened across the primary winding of coil 115 extending to loudspeaker 180. The party at station A would then ask through the transmitter 10, the state of business of the caller etc., with the transmission battery being fed from relay 130 to the transmission circuit which extends from ground over lead C79, contacts 36, 33, the transmitter and receiver of station A over contacts 42, conductor C83, condenser 105, through the center tap of the secondary winding of hybrid coil 100; through an amplifier 107, primary winding of coil 115 to the ground symbol, where it is induced across the secondary winding of coil 115 to loudspeaker 180 at the front door. A resistance comprising resistor R94 connected to battery would thereby act as a balancing network to balance the line when conversing from station A to the front door. The front door caller, by means of the microphone 170 would then state his business over a circuit including resistance battery R94, primary winding of hybrid coil 100, through the microphone 170 to the ground symbol via contacts 131, where it is induced across the secondary winding of hybrid coil 100 and condenser 105, with resistor R95 acting as a balancing network in this direction.

Assuming that the party who answered the call at station A was not the party wanted by the front door caller, the party at station A could then signal other stations over the intercom line in a manner previously described in search of the wanted party. Assuming this party to be at station B, the answering thereat would notify this party that someone is awaiting his attention at the front door. The party at station B would then depress the push-turn key 40' to connect with the caller in the same manner described with regards to station A.

*Intercom Calls*

Although an intercom call was actually described in "Transferring a Call," further illustrations are considered necessary. For instance should a party at station A desire to make a conference call with all the parties at the different stations participating, he may proceed to turn his push-turn key 40 and dial a conference call digit code, such as digit "0." As previously mentioned, the turning of the key 40 would operate relay 140, whereby each station would receive one ring to anticipate an intercom call. Thereafter, the dialling of the digit "0" would cause the ringers 15, 16 and 17 to ring ten times in a manner previously described, wherein as many parties that are in the vicinity of the different stations may all answer upon hearing the ten rings on their respective ringers. These other parties, such as at stations B and C, would turn their respective push-turn keys to connect their telephones with the extension lines C78 and C79. As previously mentioned transmission battery over the extension or intercom line would be provided through the winding of relay 140.

Should an incoming call from the main exchange come in at a time that an intercom call is in progress, it will not be deterred in any manner since these calls are on separate lines. The incoming call at this time would of course ring the ringers 90, 15, 16 and 17 in the manner previously described. Any of the stations could thus decide who should answer the call if they are on a conference call at this time, and a party such as at station A would turn his push-turn key to normal to connect with the main exchange line and disconnect from the intercom line. Thus, the intercom call may continue at the same time that one station is conversing over the outside line. It may be further added, that should the party that answered the outside call at one of the stations not be the particular party wanted, this party could operate his hold key and turn his push-turn key to again connect with the intercom line and notify the party wanted that an outside call is awaiting his attention.

At a time when two or more parties are conversing over the intercom line, since relay 140 has contacts 141 closed, the armatures of the ringers 15, 16 and 17 would be leaning against one of the gongs of the ringers. Thus, when the call is terminated and relay 140 restores, the ringer armature would cause the striker arm to hit the other gong when the current is removed, thus giving a single ring at each station at the termination of an intercom call. This would indicate to parties that did not participate in this terminated intercom call, that the intercom line is idle, and can now be utilized if they so desire.

The single ring at the termination of a call may be objectionable to people who may have one of these stations in their bedroom where such a ring may be disturbing, as well as misleading, since the single ring may be an anticipation of a code call to follow. To overcome this minor objection, FIG. 2 and the Y wiring may be added to prevent both the single ring at the beginning and termination of an intercom call. Using FIG. 2 and Y wiring, when a party at a station such as A, makes an intercom call by manually turning key 40, relay 140 will operate to close contacts 141, but contacts 211 have the circuit to ringers 15, 16 and 17 open. At contacts 142 an obvious circuit is closed to relay 220. Relay 220 operates, closes contacts 221 to prepare a circuit to relay 210. Upon receipt of the dialled code digit, relay 140 will respond by restoring and operating the number of times corresponding to the digit dialled. Each time relay 140 restores during receipt of the dialled digit, contacts 142 open the circuit to relay 220, however relay 220 is slow-to-release and remains operated throughout the digital impulse series. Contacts 143 intermittently close ground to relay 210, whereupon relay 210 operates, and also being of the slow-to-release type, remains operated. Contacts 211 will close the ringing current to ringers 15, 16 and 17 via a circuit including resistance battery, conductor C191, through the ringers, conductors C192, contacts 141, Y wiring, contacts 211, and 112 to ground. Thus by means of contacts 141, relay 140 for each impulse received will ring the ringers accordingly. At the end of the digital impulse series, and after a short duration internal relay 210 will restore to open the ringing current to the ringers whereupon, at the termination of the call the ringers will not ring when relay 140 restores.

It should be further stated as well as be obvious, that a conference call could also be made between an outside line and all of the stations, by merely having all the stations remove their handsets and leave their respective push-turn keys in their normal positions.

While this invention has been in particular described with reference to a farm or a warehouse, it is to be understood that many types of business or establishments would have need for the described system, and while one embodiment of the invention has been disclosed, it will be further understood that various modifications may be made therein which are within the true spirit and scope of the invention.

What is claimed is:

1. In an intercommunicating telephone system, a single residence having a plurality of telephone stations, an intercom line commonly connectable thereto by each of said stations, a main exchange line commonly connectable thereto by each of said stations for accepting incoming calls, a combination push-turn key, a dial and a direct current ringer at each of said stations, circuit connections effective in a first manual turning position of said keys at said stations for directly connecting said stations to said intercom line, means in said residence intermittently operated responsive to one of said stations operating its associated dial in accordance with the predetermined digit over said intercom line, each operation of said means simultaneously operating said ringers at all of said stations, the number of rings corresponding to the digit dialled, an alternating current ringer connected across said main exchange line at said residence, an alternating current relay in bridge of said other ringer operated responsive to a ringing signal received over said main exchange line during an incoming call for intermittently operating said ringers at each substation regardless of whether or not said stations are connected to said intercom line, and circuit connections effective in a second manual turning position of said keys at said stations for connecting said stations to said main exchange line.

2. In an intercommunicating telephone system, a single residence subscriber having a plurality of telephone stations, an intercom line common to all of said stations, a main exchange line common to all of said stations; each of said stations comprising a combination push-turn key, a station ringer, and a dial for transmitting digital impulses; a line ringer and a relay connected across said main exchange line and each intermittently and simultaneously operated responsive to the receipt of an interrupted ringing signal over said main exchange line on an incoming call, a first means effective responsive to the intermittent operation of said relay for intermittently ringing said station ringers at all of said stations, contact means effective responsive to the manual turning of said key to a first position to connect one of said stations to said intercom line upon initiating an intercom call, a third means operated responsive to said connection of said one station to said intercom line for ringing said station ringers only once at all of said stations to anticipate the initiation of an intercom call, said third means further operated responsive to digital impulses transmitted by the operation of said dial at said one station to operate said station ringers at all of said stations once for each impulse, the number of rings corresponding to the number of digital impulses transmitted, to thereby notify a predetermined party at any second station of said stations that said party is wanted on said intercom line, and said third means still further effective to provide transmission battery for said one station and said second station when said second station connects with said intercom line.

3. An intercommunicating telephone system as claimed in claim 2, including a loudspeaking means at the front door of said residence, and a fifth means effective operated responsive to the manual depression said key at said one station for connecting said one station to said loudspeaking means for conversing over said connection.

4. In an intercommunicating telephone system, a residence having a plurality of telephone stations dispersed therein including a plurality of parties having access to said stations and each party having a separate ringing code as well as a common ringing code, a main exchange line commonly connectable thereto by each of said stations, an intercom line commonly connectable thereto by each of said stations; each of said stations comprising a telephone instrument normally resting on a hookswitch, a dial for transmitting digital impulses, a combination push-turn key, and a direct current ringer; means effective responsive to the manual turning of said key to a first position and the removal of said telephone instrument from said hookswitch at any of said stations for connecting said station to said intercom line, relay means operative responsive to the connecting of any of said stations to said intercom line for causing all of said direct current ringers to automatically ring once only to indicate an intercom call, said relay means further operative to follow digital impulses received from the dial of a station connected to said intercom line to ring said ringers at all of said stations the number of rings corresponding to the digital impulses received, wherein said parties at said stations will answer the call if the number of rings correspond to their predetermined separate ringing code or said common ringing code, a second relay means operative responsive to an incoming call over said main exchange line for intermittently operating said direct current ringers at all of said stations regardless of whether said stations are connected to said intercom line, means effective responsive to the manual turning of said key to a second position by a party at any one of said stations which is connected to said intercom line for disconnecting said one station from said intercom line and connecting said one station to said main exchange line.

References Cited in the file of this patent

UNITED STATES PATENTS

| | | |
|---|---|---|
| 2,523,671 | Vincent | Sept. 26, 1950 |
| 2,783,308 | Campbell | Feb. 26, 1957 |
| 2,845,492 | Kaye et al. | July 29, 1958 |
| 2,871,303 | Da Riva | Jan. 27, 1959 |
| 2,883,472 | Stehlik | Apr. 21, 1959 |
| 2,936,341 | Greshel et al. | May 10, 1960 |